UNITED STATES PATENT OFFICE.

CARLETON ELLIS, OF MONTCLAIR, NEW JERSEY.

EDIBLE OIL PRODUCT.

1,037,881. Specification of Letters Patent. Patented Sept. 10, 1912.

No Drawing. Application filed May 28, 1912. Serial No. 700,234.

*To all whom it may concern:*

Be it known that I, CARLETON ELLIS, a citizen of the United States, and a resident of Montclair, in the county of Essex and State of New Jersey, have invented certain new and useful Improvements in Edible Oil Products, of which the following is a specification.

This invention relates to a process of making an edible oil product especially a composition suited for use as a vegetable lard and relates in particular to the use of hydrogenated oils and the like, especially in conjunction with cocoanut oil or fat with or without hydrogenation treatment, and relates in particular to a process of making a composition comprising hydrogenated soya bean oil or cotton seed oil and cocoanut oil and to the composition derived by such process all as more fully hereinafter described and as claimed.

Ordinary cotton seed oil has a slightly disagreeable odor and is liquid in consistency. By a treatment with hydrogen in the presence of a catalyzer, such as finely divided nickel, a solid product is secured which is practically free from odor, and which may be made to blend under certain circumstances with oils or fat such as cocoanut oil, to produce a vegetable lard, particularly well adapted to culinary operations. Such a product, however, is not fully satisfactory in appearance for many purposes, and by the present invention special treatment is provided which affords a product of the proper appearance.

To illustrate the present invention, the following formula and method of treatment will be given: Ninety parts of cotton seed oil are mixed with ten parts of cocoanut oil and the mixture subjected to the action of hydrogen at a temperature of from 150° to 160° C. in the presence of finely divided nickel, whereby a large proportion of the unsaturated material is converted into saturated material. The iodin number of the composition may be thereby reduced from about 110 to 120 down to about 20 to 30 or thereabout. A solid composition is produced, which is then subjected to the operation of aeration. The aeration treatment comprises beating the hydrogenated product with rapidly revolving paddles or blades, until a sufficient quantity of air is incorporated in the product, in a finely vesiculated position, to produce a material of the proper consistency and light colored appearance. Ordinarily I prefer to incorporate in this manner a volume of air equal to 5% to 10% of the volume of the oil which is being aerated. The proportion of cocoanut oil which may be thus incorporated is preferably about 10%, although twice this amount may be used if desired. The amount should not, however, under ordinary conditions, exceed 30%, unless care be taken to completely hydrogenate all unsaturated material in the cocoanut oil. To be sure, cocoanut oil has an iodin value of only 7 to 10 which is indicative of the small proportion of unsaturated bodies present. But, in spite of this, in order to secure a permanent product, which does not separate or grow lumpy on standing, and which remains in a perfectly neutral condition for a long period of time, even when exposed to the air, it is desirable that the iodin number of the cocoanut oil should be reduced to practically zero, if larger proportions than 30% or thereabout, are incorporated with the hydrogenated cotton seed oil.

In a similar manner, cocoanut oil may be incorporated in aerated mixture with hydrogenated corn or peanut oil, or similar vegetable oils, it being desirable to materially reduce the iodin number by hydrogenation, in the case of these oils, in the event cocoanut oil to the extent of 20% or 30% is to be incorporated. In any case, hydrogenation should preferably be carried to the point where a soft body of the consistency of ordinary lard is produced.

The advantages of such a product over ordinary lard are several. One is that owing to the high evaporation point, of the more volatile components of the hydrogenated product as above set forth, there is less smoke and fume caused when heating these oils in culinary operations. Furthermore, owing to the higher temperature which may be reached with compositions of this character, better effects are secured, especially in frying operations.

While it is possible to aerate ordinary fat, by treating in the manner described, it is difficult to produce a product which will keep for a long period when intimately incorporated with air in this manner, and treatment with hydrogen enables a stable product to be secured. By hydrogenating the cotton seed or corn oil or similar oils to materially reduce the iodin number, the more sensitive double bonds are saturated with hydrogen and thereby eliminated and oxidation tendency is reduced to a minimum.

Various catalyzers may be used in hydrogenating the oil in accordance with the present invention, but I preferably make use of either finely divided nickel or metallic cerium, or a mixture of metallic nickel and cerium.

The introduction of hydrogen into cocoanut oil is rather difficult, and the complete hydrogenation of this oil is sometimes troublesome. In order to effect a complete treatment of this oil and other oils which are rather resistent to hydrogenation, I preferably dissolve the oil in a solvent which is a good solvent relatively speaking, for hydrogen gas. Many oils, glycerin, water and the like, dissolve only very small quantities of hydrogen gas. On the other hand, solvents such as ordinary alcohol, wood alcohol, ethyl acetate, benzol, xylol, toluol, carbon tetrachlorid and the like, absorb hydrogen more readily. Some of the solvents, such as alcohol, do not mix readily with oils such as cotton seed oil in the cold, but when heated to a temperature such as is employed in hydrogenation, the oil and alcohol or other similar body, mix readily and the thinning or solvent material serves as an absorbing body for the hydrogen gas. The advantage of operation in this way is that even though the catalyzer becomes coated with oil which is saturated with hydrogen gas, the thinning solvent acts as a carrier of hydrogen gas to the catalyzer and from thence to the unsaturated oil. Also it renders the oil more mobile, so that diffusion takes place to a greater extent, and the saturated material formed, thus diffuses away from the catalyzer and permits the unsaturated material to come in contact therewith. Some of the solvents referred to, show a tendency within certain limits, of absorbing greater quantities of hydrogen with increase of temperature. The alcohols as well as the hydrocarbons, mentioned, show this peculiarity which is advantageous because it is usually true that increase in temperature causes gases to become less soluble in liquid materials.

To recapitulate, the process involves hydrogenating an oil of a vegetable nature, such as cotton seed, corn or peanut oil, to produce a hydrogenated product substantially unaffected by the action of air when intimately incorporated therewith and in mixing such normally liquid oils, stiffened or hardened by hydrogenation, with a smaller quantity of an oil or a normally hard fat or grease, such as cocoanut oil, which, preferably, has also been hydrogenated to reduce its iodin number substantially to zero, and in preferably chilling and beating the composition to introduce a quantity of air to aerate same, said quantity of air being preferably an amount equal to 5–10% of the total volume of the oil.

Reference is herein made to my co-pending application Serial No. 714,393, filed Aug. 10, 1912, as regards certain divisional matter which is not claimed herein.

What I claim is:—

1. The process of making an edible oil which comprises hydrogenating cotton seed oil and cocoanut oil, and in aerating same.

2. The process of making an edible oil which comprises hydrogenating cotton seed oil, adding cocoanut oil and aerating to introduce a volume of air at least 5% of the volume of the oil composition.

3. An edible oil composition comprising hydrogenated cotton seed oil and cocoanut oil containing vesiculated air.

4. An edible oil composition comprising edible hydrogenated vegetable oil containing vesiculated air.

5. An edible oil composition comprising hydrogenated cotton-seed oil containing vesiculated air.

6. An edible oil composition comprising hydrogenated cotton-seed oil and other edible oily material blending therewith, said composition containing vesiculated air.

7. An edible oil product comprising a major proportion of hydrogenated cotton seed oil and a minor proportion of cocoanut oil, said composition containing vesiculated air.

8. An edible oil composition comprising about 90% of hydrogenated cotton seed oil and about 10% of cocoanut oil; said composition containing 5–10% by volume of vesiculated air.

9. An edible oil product comprising hydrogenated cotton seed oil and hydrogenated cocoanut oil.

10. An edible oil product comprising hydrogenated cotton seed oil and a cocoanut oil stiffening material.

11. An edible oil product comprising hydrogenated cottonseed oil and edible oily material blending therewith.

12. An edible oil product of lard-like consistency comprising edible hydrogenated oil and edible oily material blending therewith.

13. An edible fatty product of substantially lard-like consistency, comprising edible hydrogenated-oil material and edible fatty material blending therewith.

14. An edible fatty product comprising edible hydrogenated oil material and edible fatty material blending therewith.

Signed at Montclair in the county of Essex and State of New Jersey this 23rd day of May A. D. 1912.

CARLETON ELLIS.

Witnesses:
BIRDELLA M. ELLIS,
ANITA B. FERRIS.